Dec. 22, 1959 H. G. THAMES ET AL 2,918,539

TELEPHONE INSTRUMENTS OF THE STANDING HAND SET TYPE

Filed Feb. 19, 1957 7 Sheets-Sheet 1

INVENTORS
HANS GÖSTA THAMES
SVEN TURE ÅBERG
BY [signature]
ATTORNEY

TELEPHONE INSTRUMENTS OF THE STANDING HAND SET TYPE

Filed Feb. 19, 1957 7 Sheets-Sheet 2

INVENTORS
HANS GÖSTA THAMES
SVEN TURE ÅBERG
BY [signature]
ATTORNEY

Dec. 22, 1959 H. G. THAMES ET AL 2,918,539

TELEPHONE INSTRUMENTS OF THE STANDING HAND SET TYPE

Filed Feb. 19, 1957 7 Sheets-Sheet 3

INVENTORS
HANS GÖSTA THAMES
SVEN TURE ÅBERG
BY [signature]
ATTORNEY

TELEPHONE INSTRUMENTS OF THE STANDING HAND SET TYPE

Filed Feb. 19, 1957

INVENTORS
HANS GÖSTA THAMES
SVEN TURE ÅBERG
BY [signature]
ATTORNEY

TELEPHONE INSTRUMENTS OF THE STANDING HAND SET TYPE

Filed Feb. 19, 1957

INVENTORS
HANS GÖSTA THAMES
SVEN TÜRE ÅBERG

BY [signature]
ATTORNEY

TELEPHONE INSTRUMENTS OF THE STANDING HAND SET TYPE

Filed Feb. 19, 1957 7 Sheets-Sheet 6

INVENTORS
HANS GÖSTA THAMES
SVEN TURE ÅBERG

BY [signature]
ATTORNEY

TELEPHONE INSTRUMENTS OF THE STANDING HAND SET TYPE

Filed Feb. 19, 1957 7 Sheets-Sheet 7

INVENTORS
HANS GÖSTA THAMES
SVEN TURE ÅBERG
BY [signature]
ATTORNEY

United States Patent Office 2,918,539

Patented Dec. 22, 1959

2,918,539

TELEPHONE INSTRUMENTS OF THE STANDING HAND SET TYPE

Hans Gösta Thames, Hagersten, and Sven Ture Åberg, Solsidan, Saltsjobaden, Sweden, assignors to Telefonaktiebolaget L M Ericsson, Stockholm, Sweden, a corporation of Sweden Application February 19, 1957, Serial No. 641,156

Claims priority, application Sweden February 21, 1956

17 Claims. (Cl. 179—167)

This invention relates to telephone instruments of the standing hand set type for instance as shown in Patent 2,822,432. In such instruments the cradle-switch consists of a spring operated cradle-switch plunger projecting from the base plate of the instrument, said cradle-switch plunger being displaceable, for example perpendicularly to the plane of the base plate, and supporting a button or the like at the end, projecting outside the base plate. The portion of the plunger lying within the base plate is provided with members which co-operate with contact springs arranged in the instrument, said contact springs switching the instrument from signalling position to talking position. When the instrument stands on the table (or some other support), the button rests against the surface of the table and the plunger is, against the action of a spring, pushed in so far, that the contact springs will switch the instrument to signalling position. When the instrument is lifted from the table, the plunger, operated by the spring, will be pushed out from the base plate, the contact springs thereby switching the instrument from the signalling position to the talking position. Then a call occurs in the station and the necessary switch members—e.g. a link circuit with registers in case the apparatus is an automatic instrument—are connected to the instrument, so that the subscriber may dial the desired number. Accordingly, each time the subscriber lifts the instrument from the table, there will be a call to the station. In such instruments there exists the disadvantage that, when the subcriber lifts the instrument from the table without intending to make a call—which for instance happens when the instrument is lifted to move it from one position on the table to another position—calls to the station are effected, the switch members of the station thereby being unnecessarily rendered. This invention has for a purpose to eliminate said drawback and is characterized by the plunger being arranged so that it may be pushed into the instrument a further distance beyond the distance which the plunger is pushed, when the instrument stands on the table, its base plate facing the table, and by the plunger, on the portion lying inside the instrument, being shaped in such a way that, through co-operation between said portion and one or more stop members arranged in the instrument, the plunger will be blocked against movement out from the base plate in the position taken up by the plunger when the instrument stands on the table, besides which the details of the instrument are so arranged, that, after the plunger has been pushed in said further distance and is released, it will be brought to a completely pushed-out position by spring action.

Figures 1, 16A, 16B:
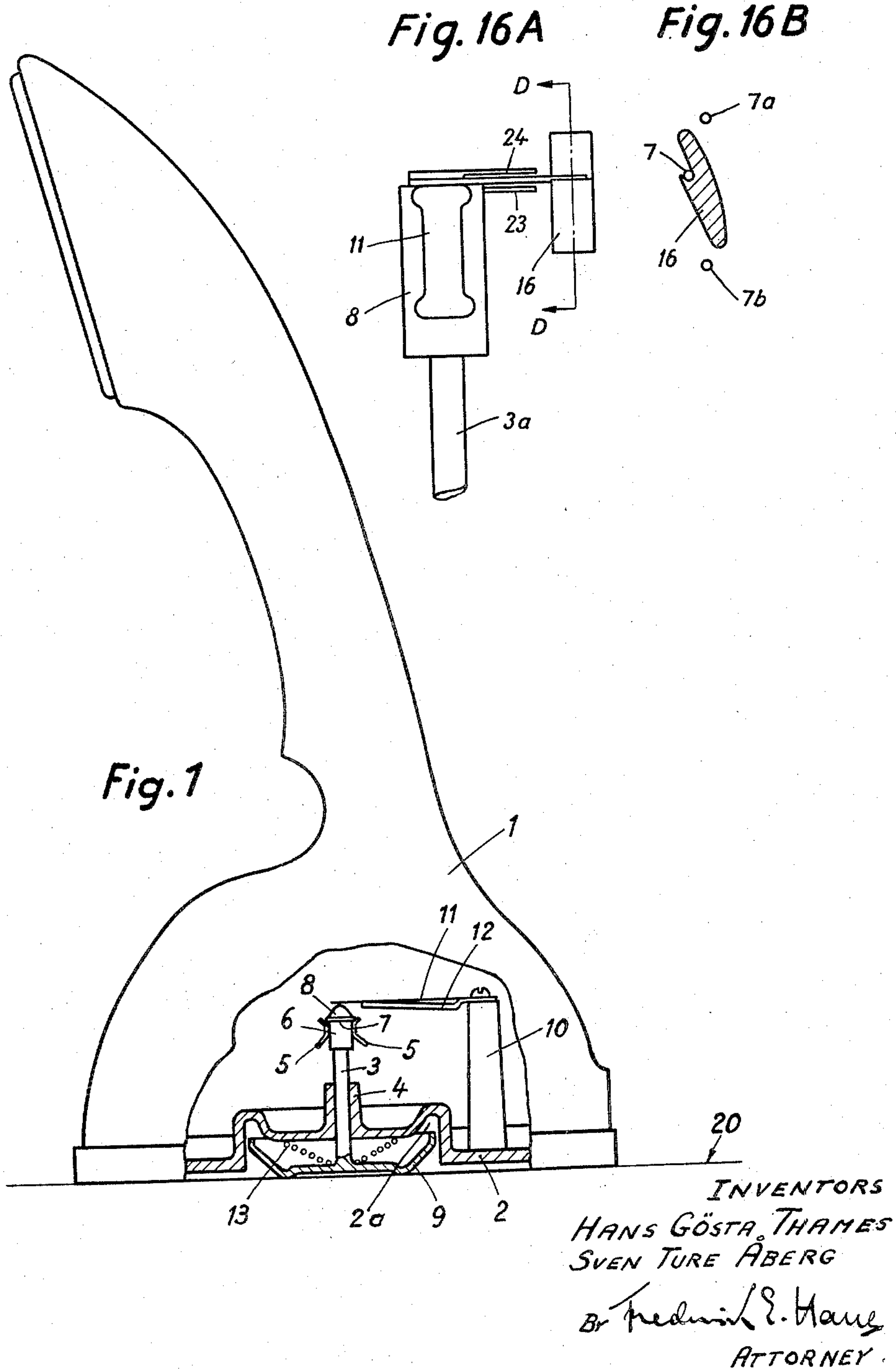
Figure 2:
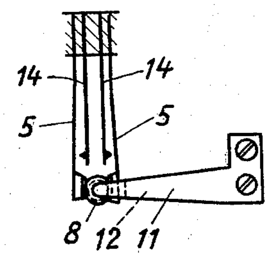
Figure 5:
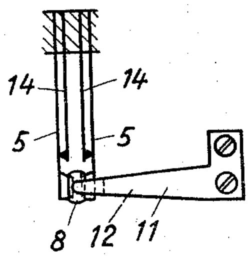
Figure 9:
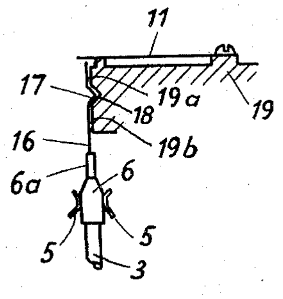
Figure 6:
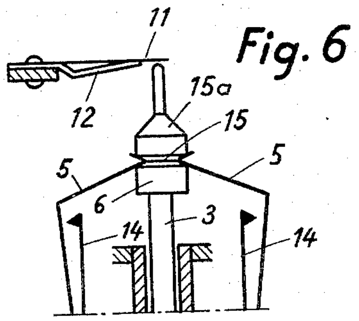
Figure 7:
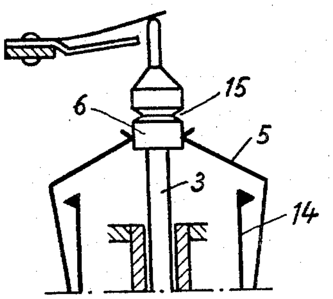
Figure 8:
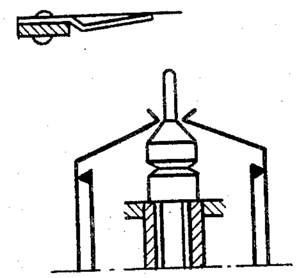
Figure 3:
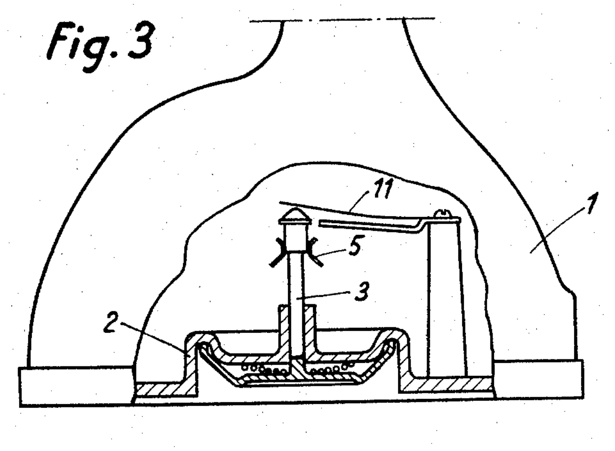
Figure 4:
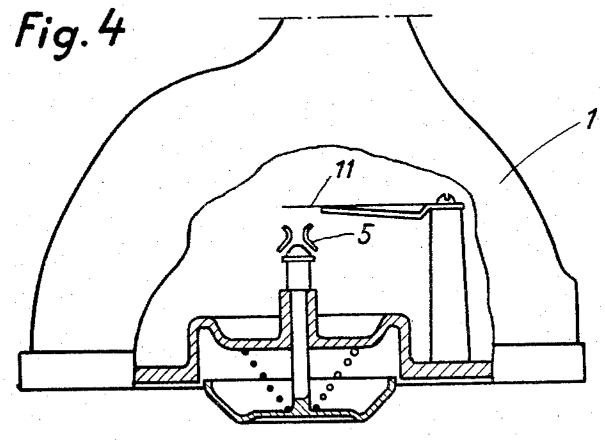
Figures 10, 10A, 11, 11A, 12, 12A:
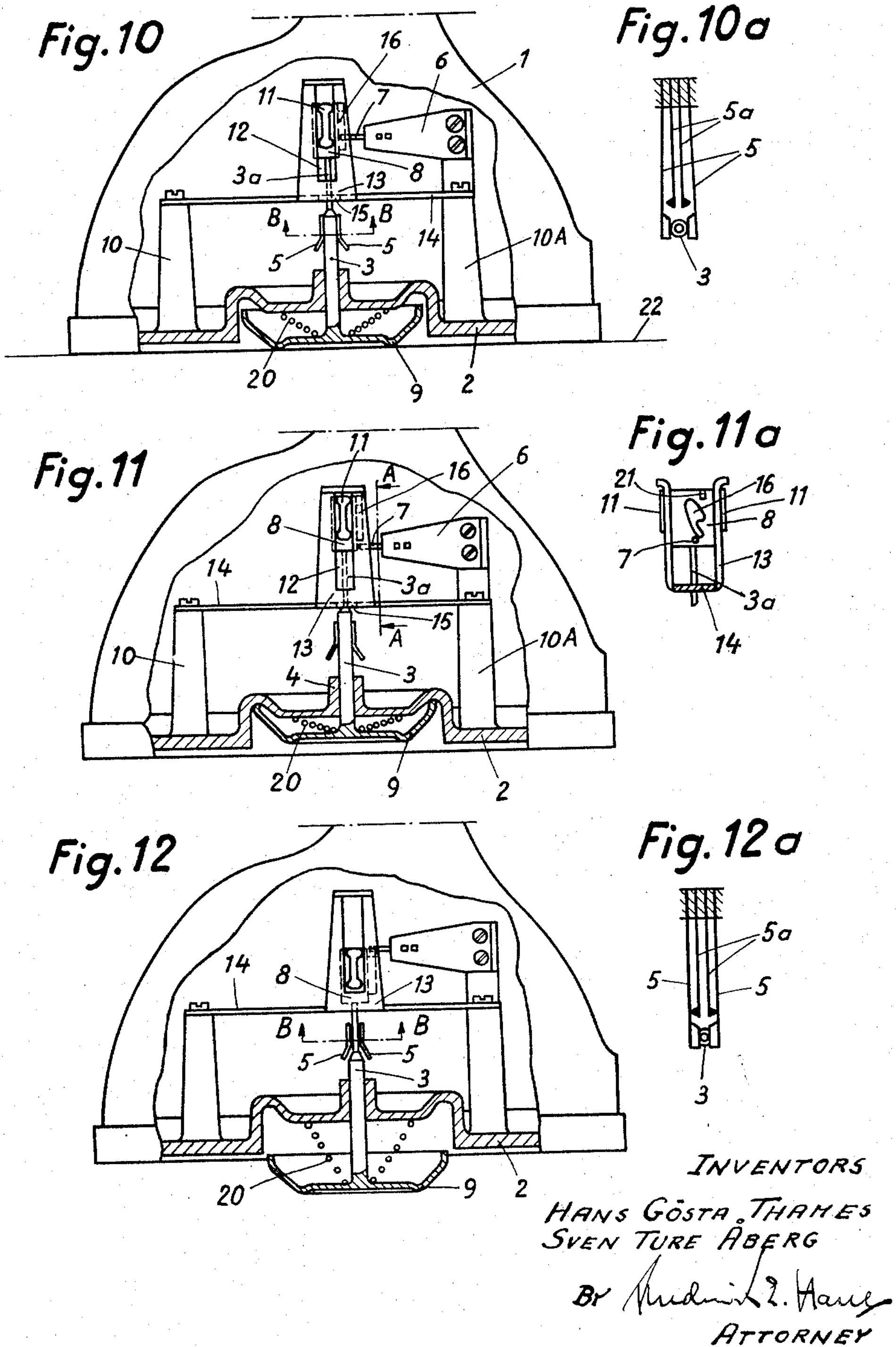
Figure 15:
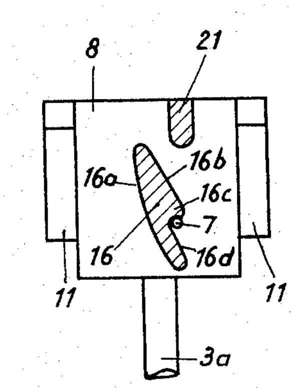
Figure 15B:
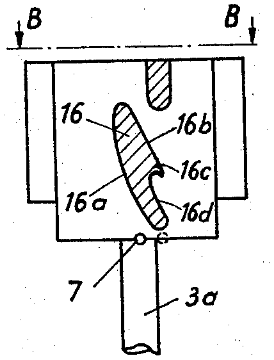
Figure 15C:
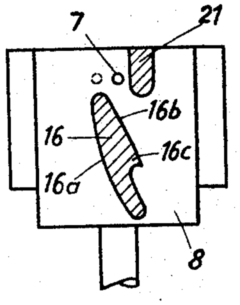
Figure 15A:
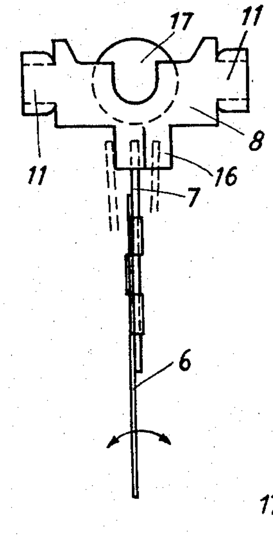
Figure 14:
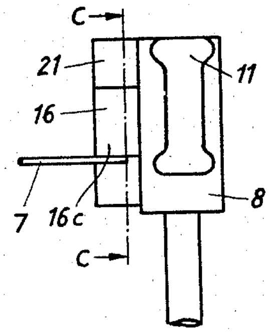
Figure 14:
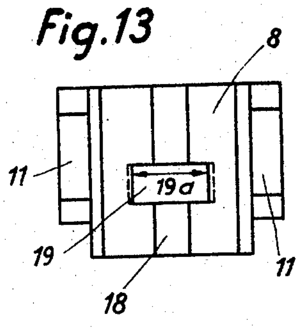
Figure 13A:
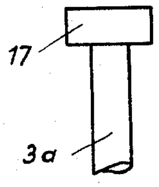
Figure 13B:
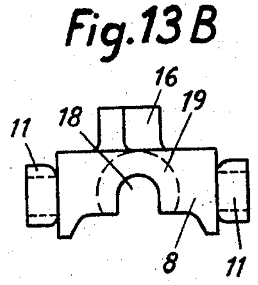
Figure 17:
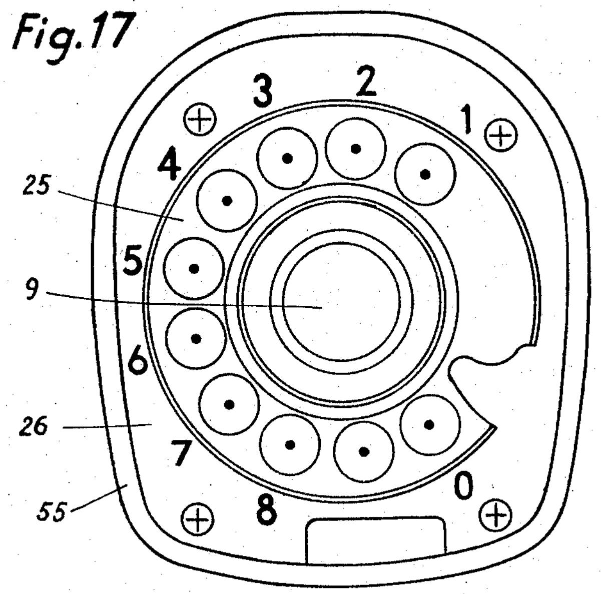
Figure 18A:
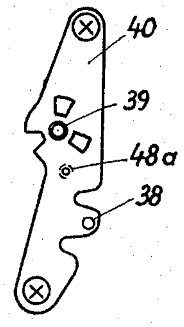
Figure 21:
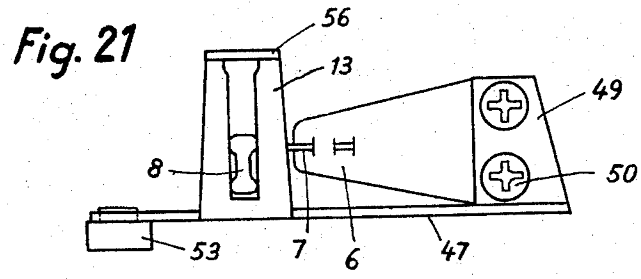
Figure 22:
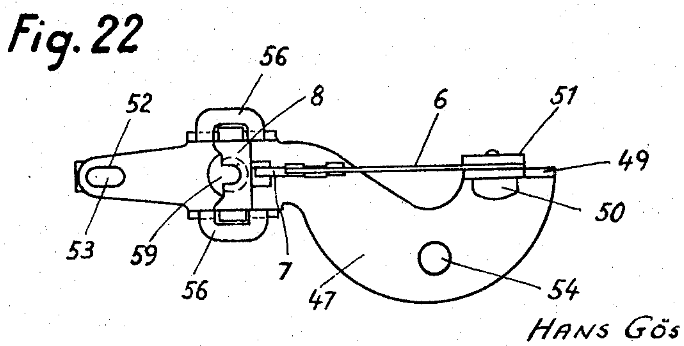
Figure 20:
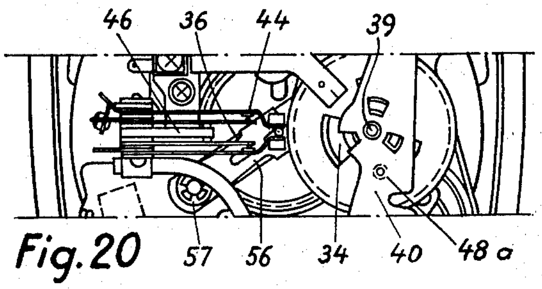
Figure 19A:
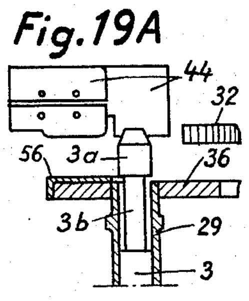
Figure 19:
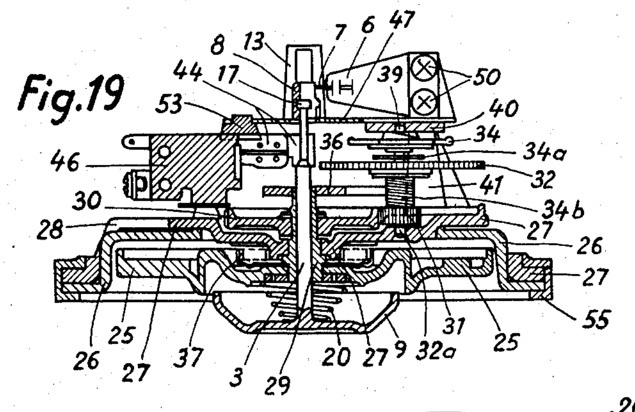
Figure 19B:
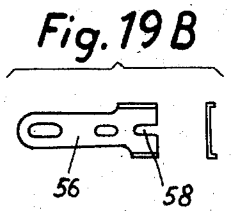
Figure 18:
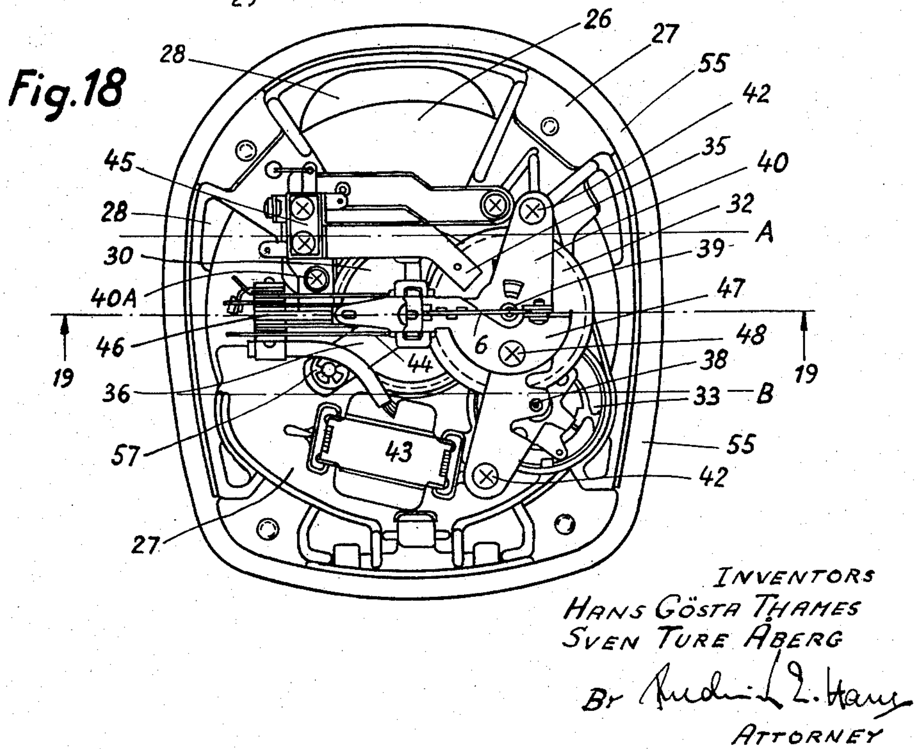

The invention will be described more in detail with reference to the annexed drawings. Figs. 1, 3 and 4 of said drawings are side views of the instrument having a portion of the casing removed and the base plate and the button are shown in section through the longitudinal axis of the plunger. Figs. 2 and 5 are top plan views of the spring set having the springs in two different positions. Figs. 6–8 are side views of a modification of a switching mechanism having contact springs and operating member in different positions. Fig. 9 shows in side view a further modification of the switching mechanism. Figs. 10–15 show a modification, Figs. 10–12 thereby corresponding to Figs. 1, 3 and 4 in the first described embodiment, i.e. they are side views of the instrument having a portion of the casing removed and the base plate and the button in section through the longitudinal axis of the plunger. Figs. 10*a* and 12*a*, respectively, are sections taken along the line B—B in Figs. 10 and 12, respectively, and they slow the contact springs of the instrument. Fig. 11*a* is a section taken along the line A—A in Fig. 11. Figs. 13 and 13B show a sliding member seen from behind and in top plan view, respectively, and Fig. 13A shows the upper portion of the cradle-switch plunger which is fixed to the sliding member. Fig. 14 shows the sliding member from the side. Figs. 15, 15B–C show the same sliding member and a stop spring co-operating with the same (in section C—C in Fig. 14) in different positions, and Fig. 15A shows the sliding member and the stop pin in top plan view (B—B in 15B). Figs. 16A and B show a further modification, Fig. 16A showing the sliding member seen from the side and Fig. 16B being a section through the cam member taken along the line D—D in Fig. 16A. Figs. 17–22 show another modification. Fig. 17 shows the set seen from below, Fig. 18 is a plan view of the body of the set. Fig. 18A is a plan view of a detail, Fig. 19 is a section taken along the line 19—19 in Fig. 18. Fig. 19A shows with some modifications the centre part of Fig. 19 on a larger scale and Fig. 19B shows a detail in plan view and in end view. Fig. 20 shows the portion lying between lines A—B in Fig. 18 wtih some modifications. Figs. 21 and 22 are respectively a side view and a plan view of a detail.

In Figs. 1–9 a casing 1 of the instrument is partly removed on one side of the base portion in order to show the components mounted therein. The base plate or body of the instrument is indicated by 2 and 3 is a suitably cylindrical plunger movable in axial direction in a guide portion 4 and intended to operate the contact springs 5 of the instrument, said springs switching the instrument between talking and signalling positions and being at their one end securely fixed to the instrument, for instance at a post fixed to the base plate. The plunger 3 has at the top 6 a somewhat greater diameter and is provided with a ring-shaped shoulder 7 and terminates at the top a conical portion 8. The portion of the plunger 3 situated outside the base plate 2 terminates in an operating push button 9 having the shape of a circular lid which may be pressed into a circular recess 2*a* in the base plate 2. In a post 10 fixed to the base plate there is fixed the leaf spring 11 which suitably with tension rests against the support 12. A spiral spring 10 fixed between the button 9 and the base plate 2 tends to move the plunger 3 into the direction outwards from the base plate.

In Fig. 1 the instrument is supposed to stand on a table surface 20, the button being, against the action of the spring 13, pushed into the shown position, in which the two contact springs 5 are resting with pressure against the portion 6 on both sides of the same, immediately below the shoulder 7. As is shown in Fig. 2 the contact springs 5 then take up such a position, that the contacts between springs 5 and two inner springs 14 are opened, whereby the instrument is switched into the signalling position. In the position according to Figs. 1 and 2 the plunger 3 is blocked against movement downwardly by the shoulder 7 resting against the springs 5, and the instrument may thus be lifted from the table without any change in the position of the portions. Thus calls in the station do not occur when the instrument is lifted. If, however, the subscriber wishes to make a call, the button 9 will be pushed from the position taken up in Fig. 1, to the position in Fig. 3, i.e. the button is pushed in so far as to strike against the base plate 2. The springs 5 still rest in this position against the cylindrical portion 6 of the plunger 3 and therefore the position of the springs has not been altered and so they will still occupy the position shown in Fig. 2 with open contacts. During the last mentioned pushing-in movement the conical end 8 of the plunger 3 strikes against the leaf spring 11 and tensions it. When then the button 9 is released, the plunger with the button—when actuated by the spring tension on one hand in the leaf spring 11 and on the other hand in the spiral spring 13—will be given a movement into the direction outwardly from the instrument, having so strong an acceleration that the friction between the shoulder 7 and the contact springs 5 is overcome, the shoulder being brought past the springs 5 to the position shown in Fig. 4, in which the shoulder 6 strikes against the guide portion 4. Thus the continued movement of the plunger is prevented. The contact springs 5 by their spring action, are now moved towards each other, the contact between them and the springs 14 being closed, whereby the instrument has been switched to the talking position according to Fig. 5. To obtain a call in the station it is thus necessary that the subscriber, after the instrument has been lifted from the table, pushes in the button 9 against the base plate and then releases the button, while, if the subscriber lifts the instrument from the table and then moves it from one place to another without operating the button, no call will reach the station.

Figs. 6–8 show an embodiment of the portion 6 of the plunger 3, which somewhat deviates from the one described above, and these figures correspond, in order, to the Figs. 1, 3 and 4 in the embodiment described previously. The portion 6 is here provided with a V-shaped notch 15 running circularly, in which rest the free ends of the contact springs 5 bent at an angle, before the subscriber has operated the button. These last mentioned springs are in this embodiment placed so that their longitudinal direction is substantially parallel to the longitudinal axis of the plunger 3. In Figs. 6–8 only those portions have been shown which are necessary for the co-operation between the portion 6 of the plunger 3 and the contact springs 5. When the button 9 is manually pushed into its bottom position, the plunger 3 will be displaced so that the springs 5 slide out of the notch 15 and then rest against the portion 6 (Fig. 7). The contacts between the springs 5 and 14 are then still opened. When the button is released and the plunger is rapidly moved downwardly, the bent ends of the springs 5 will pass the notch 15, the portions now occupy the position shown in Fig. 8, in which the contacts between the springs 5 and 14 are closed. An effective component of force is obtained during the movement downwardly of the plunger when the points of the springs 5 come into contact with the conical surface 15*a*, a downwardly directed component of force, acting on the plunger due to the wedge-effect between the springs 5 and the surface 15*a*.

With the now described embodiment the blocking function is performed by means of a spring in the spring set arranged for the switching of the instrument between the talking and the signalling position. This is not necessary but a separate spring may instead be used as stop spring. It is also possible to design the device so that a stop spring 16 (Fig. 9) at its one end is fixed to the upper portion 6*a* of the plunger 3, the spring 16 at the top being provided with a protrusion 17 which, when the plunger is in a position corresponding to that of the instrument standing on the table, projects into a recess 18 in the body 19 of the instrument, thereby blocking the plunger against displacement. When the subscriber wishes to make a call and pushes in the buttom with the plunger 3, the spring 16 will be displaced upwardly, thereby actuating the leaf spring 11 so that it is tensioned as in the embodiment described previously. At the same time the protrusion 17 of the spring 16 has been released from the recess 18 in the body 19 and rests, when the button 9 is pushed into its bottom position, against the surface 19*a* of the body. When the button 9 then is released and the plunger 3 with the spring 16 is swiftly displaced downwardly, the protrusion 17 will pass the recess 18 in the body and rests, after the plunger has been displaced to its lowest position, against the surface 19*b* in the body, in which position the contact springs 5 are making contact with the contact springs 14 so that the position corresponds to that of Fig. 5, i.e. the instrument is switched in talking position.

In the now described embodiments the plunger 3, during a portion of its movement, is operated by two springs, on one hand by the spiral spring 13 and on the other hand by the leaf spring 11. The spring 11 may be omitted, for instance when the spiral spring 13 is so dimensioned that, after the subscriber has pushed the button into its bottom position, it has sufficient tension to impart to the plunger 3 an acceleration such that it passes the stop position at the springs 5 without being blocked.

In the embodiment shown in Figs. 10–15, 1 indicates, as previously, the casing, 2 the base plate (see Fig. 11), 3 a plunger (cradle-switch plunger) movable in axial direction in a guide portion 4 in the base plate and intended to operate the contact springs 5, which switch the instrument between the talking and the signalling position, said plunger at its lower portion being terminated by a push button 9. The upper portion 3*a* of the plunger has a smaller diameter than the lower portion. A spiral spring 20 fixed between the button 9 and the base plate tends to displace the plunger in the direction outwardly from the base plate. To block the plunger 3 and the button 9 in a predetermined position—the one corresponding to that of the instrument standing on the table (Fig. 10)—there is a stop device consisting of a leaf spring 6 securely fixed at its one end in the body of the instrument. At the free end of said leaf spring there is fixed a pin 7, for instance of piano-wire, which co-operates with a sliding member 8 supported by the plunger 3 and displaceable in the longitudinal direction of the latter. The leaf spring 6 is located in the plane of the drawing (Fig. 10) and the pin 7 can thus move in a plane perpendicular to the plane of the drawing. The leaf spring 6 is fixed to a post 10*a* connected with the base plate. The sliding member 8 is guided in its movement in such a way that a stud 11 projecting on each side of the sliding member (Figs. 11 and 11*a*), slides against the edges of a slit 12 provided in each branch of a U-shaped clamp 13 supported by and suitably made in one piece with a bridge 4, the both ends of which are fixed to the posts 10 and 10A, respectively. The upper portion 3*a* of the plunger 3 passes through an opening 15 in the bottom of the clamp 13. The sliding member 8 is at its one end provided with a guide cam 16 co-operating with the above mentioned pin 7. The sliding member 8 is shown separately and on a larger scale in Figs. 13, 13A–B, 14, it being thereby in Fig. 14 as in Fig. 11 seen side-face. The co-operation of the sliding member with the pin 7 in different positions appears from Fig. 15, 15A–C. The portion 3*a* of the plunger is at its free end provided with a cylindrical portion 17 (Fig. 13A) and the sliding member 8 (Fig. 13B) is with a partly cylindrical recess 18 for the upper portion 3*a* of the plunger, said recess being open to one side and longitudinal, and with a partly cylindrical recess 19 for said cylindrical portion 17 of the plunger. The opening 19*a* of the recess 19 (Fig. 13) is somewhat smaller than the diameter of the portion 17 of the plunger 3 so that this portion on insertion of the plunger in the sliding member must be pressed in. The portion 17 prevents the plunger 3 being moved in axial direction in the sliding member, whereas a motion of rotation by the pin and the button 9 is made possible without the sliding member 8 being operated.

The blocking and relsasing of the plunger 3 in different positions of the instrument will now be described more in detail with reference to Figs. 10–12 and Figs. 15 and 15A–C, which show the sliding member 8 and the pin 7, which co-operate with the same, in different positions.

In the position shown in Fig. 10 the telephone instrument is supposed to stand on the table 22 and the plunger 3 with the sliding member 8 then is in a blocked position (Fig. 15). The guide cam 16 projects substantially perpendicularly from the surface of the sliding member and forms an upwardly turned guide surface **16*b* and 16*d*, respectively, and a downwardly turned surface 16*a* and also a ratchet tooth 16*c*. The pin 7 rests in this position below the ratchet tooth 16*c* and the sliding member 8 which, by means of the spring 20, is urged to move it downwardly, is blocked by the pin 7 against such. In this position, corresponding to Fig. 10, the lower thicker portion of the plunger 3 is located between the two contact springs 5, which in this position have a tension in the direction towards each other. The contact between the springs 5 and two inner springs 5*a***, Fig. 10*a*, is in this position broken, which corresponds to the instrument being switched into the signalling position. In Fig. 15A, which shows the sliding member seen from above, the pin 7 takes up the right position shown in dotted lines and it is in this position moved slightly to the right from its neutral position, shown in full lines, thus pressing with a force, which is directly to the left, from the spring 6 towards the surface **16*d*** of the guide cam.

If the subscriber now wishes to answer a call or to make a call, he lifts the instrument from the table and pushes with his finger the button into the bottom position shown in Fig. 11. The sliding member is then brought from the position shown in Fig. 15 to that shown in Fig. 15B, the guide surface **16*d* of the guide cam 16 during this movement sliding against the pin 7. The bias of the pin 7 in the direction towards the guide cam thereby increases further because the spring 6 (Fig. 15A), to which the pin 7 is fixed, is bent still more to the right. When the guide cam 16 has been displaced upwardly so much that the pin 7 is clear of the lower edge of the cam (the dotted circle in Fig. 15B), the pin will, by means of the spring tension of the leaf spring 6 (Fig. 15A), be brought to its neutral position (the full circle in Fig. 15B). As the thicker, lower portion of the plunger 3 is still located between the springs 5 (Fig. 11) the contacts between the springs 5 and 5*a*** are still opened (Fig. 10*a*). When now the subscriber releases the button 9, the latter (operated by the spring 20) and the plunger 3 and the sliding member 8 are brought to the position shown in Fig. 12. The corresponding position of the sliding member is shown in Fig. 15C. During the last mentioned movement the guide surface **16*a* slides against the pin 7 and moves it to the left, thereby simultaneously imparting a tension, directed to the right in the figure, to the spring 6, which supports the pin 7 so that the pin during this movement will press against the guide surface 16*a* (the left, dotted position in Fig. 15A). When the sliding member 8 has been lowered so much, that the upper point of the cam 16 arrives below the pin 7 (the dotted circle in Fig. 15C), the latter will be brought to its neutral position (the full circle, Fig. 15C) by means of the tension of the spring 6. During the last described movement, when the elements have been moved from the position shown in Fig. 11 to that shown in Fig. 12, the contact springs 5 will be actuated, the narrower portion 3*a* of the plunger 3 being, in the position according to Fig. 12, situated between the springs. The distance between said springs has thus been reduced. Thus the contacts between the springs 5 and 5*a*** are closed, as appears from Fig. 12*a*, whereby the instrument is switched into the talking position.

When the subscriber has finished the conversation and puts the instrument on the table, the button with the plunger and the sliding member will be pushed into the instrument until the instrument comes to rest upon the surface of the table (Fig. 10). This means that the sliding member is displaced upwardly from the position, Fig. 15C, to the position, Fig. 15, the guide surface **16*b* thereby sliding against the pin 7 and bringing it to the right. The spring 6 is thereby tensioned so that the pin 7 presses against the guide surface 16*b*. When the sliding member has been displaced upwardly so much that the ratchet tooth 16*c* has passed the pin 7, this latter, by the spring tension, is moved below the tooth 16*c* into the previously described position in Fig. 15, in which the plunger with the sliding member 8** is again blocked for movement downwardly.

The sliding member 8 also supports a stop cam 21, the object of which is the following. When the sliding member has been brought from the position according to Fig. 15B to the position according to Fig. 15C and the pin 7 has been released from the upper point of the cam 16 (according to the dotted position in Fig. 15C), the spring 6 (which then is tensioned to the left) with the pin 7 will first turn to the right and then hunt about the neutral position, provided there is no cam 21. If, on the other hand, there is the cam 21 in the way, the pin 7 will strike against the cam and the hunting motion will be damped swiftly.

In the last described embodiment (Figs. 10–15) the sliding member 8 with the guide cam 16 is supported by the cradle-switch plunger 3, while the stop pin 7 is fixedly arranged (in the vertical direction). As a relative motion between the guide cam 16 and the pin 7 is essential, the pin 7 may be mounted on the cradle-switch plunger 3 (provided the pin 7 is so mounted, that it may be elastic in a plane perpendicular to the longitudinal direction of the pin) and the guide cam may be fixedly mounted in the instrument. The pin 7 when moved will then slide against the guide surfaces of the guide cam and be bent relative to both sides of a neutral position. In Figs. 16A and 16B this embodiment is illustrated schematically. The contour of the cam member 16, which here is fixedly arranged in the instrument (for instance on the post 10A, Fig. 11), appears from Fig. 16B. Fig. 16A shows that a pin 7, which is to be resilient (for instance piano-wire) in a plane perpendicular to the longitudinal direction of the cradle-switch plunger, is fixed to the sliding member 8, which in conformity with the preceding embodiment is guided by means of the studs 11, said sliding member of course having no cam member. At the movements upwardly and downwardly of the cradle-switch plunger the pin 7 slides along the cam member 16. Fig. 16A shows the position of the pin 7, when the instrument stands on the table, in which position the plunger 3 is blocked. *7a* in Fig. 16B indicates the position, when the plunger with the button is completely pushed in, and *7b* is the position, when the plunger is completely pushed out. 23 and 24 are studs, which limit the movement of pin 7 downwardly and upwardly.

In all the embodiments now described the invention has been shown as applied to a telephone instrument intended for connection to a manual exchange but of course it may also be applied to instruments with a dial or a key set intended for connection to an automatic exchange. With instruments provided with a dial the plunger 3, in a manner known per se, may extend through a bore into the centre of the dial, as shown in for instance the British Patent No. 612,005 or in the Swedish patent application No. 9682/53 (Patent No. 156,441).

In Figs. 17–22 is shown such an embodiment, in which the plunger 3 passes through the centre of the finger plate. The figures show the body or the base plate with details, the casing, which may have the appearance shown in Fig. 1, being removed. The figures show the button 9 and the finger plate 25, said finger plate being arranged in a cup-shaped member 26, for instance of plastic material, placed in the body 27, which, in order to obtain a low weight, is partly cut out, for instance at 28. The casing rests when mounted against the upper edge of a rubber frame 55.

A hollow spindle 29 extends through an opening in the centre of the finger plate 25 (see Fig. 19). The spindle is rotatably mounted in the body 27 and in a bearing bar 36 diametrically traversing the centre of the finger plate and being in its both ends, one of which is seen in Figs. 18 and 20, fixed, e.g. by means of retaining rnigs 57 (Fig. 20) to studs or the like projecting from the body 27 of the set. The plunger 3 may be moved in axial direction in this hollow spindle 29. On the hollow spindle 29 are fixedly mounted the finger plate 25 and a gear 30, which in a known manner transmits the movement of the finger plate to the dialling mechanism known per se via the gear 31, the axis of said latter gear supporting the gear 32, which in its turn is driving the governor 33 (Fig. 18). On the same axis supporting the gear 32 there is also visible a driving plate **34*a*, a spring 34*b* and the impulse cam-wheel 34 (Fig. 20), which latter operates the impulse springs 35 of the finger plate. The two axles 38, 39, which support the governor 33 and the gears 31, 32, respectively, are at their ends, facing the body 27, mounted in the body, and at their upper ends they are mounted in holes 38, 39 in a bearing plate 40, which is shown in detail in Fig. 18A. Said bearing plate 40 is supported by posts 41 projecting from the body, one of said posts being shown at the right in Fig. 19. Two screws 42 hold the bearing plate 40 fixed to these posts (Fig. 18). 43 is an induction coil fixed to the body. To the body there is further fixed a spring set 45 containing the previously mentioned impulse springs 35, and cradle-switch springs 44 supported by a plate 46, which with a bent portion, by means of the screw 40A, Fig. 18, is fixed to the body 27. The cradle-switch springs 44 are intended for the switching of the instrument from the talking to the signalling position and are operated (as has been described in connection with the Figures 10–12) by the plunger 3**, when this is displaced inwards or outwards.

According to the invention the elements arranged for the blocking of the pin in an intermediate position, i.e. the guides 13 with the sliding member 8 mounted therein and the leaf spring 6 with the pin 7, are now mounted on a plate 47, which by means of a screw 48, through a threaded hole **48*a*, is fixed on said bearing plate 40** (see Fig. 18).

Figs. 21 and 22 show on a larger scale the plate 47 and blocking details mounted thereon. The plate 47 has furthermore the two bent portions 13, which constitute the guides, a bent portion 49, to which the leaf spring 6 is fixed by means of the screw 50 and the washer 51. The blocking function at the movements of the sliding member 8 in the guides 13 is previously described in connection with Figs. 10–12. The upper portions 56 of the guides 13 are bent. At the left end of the bearing plate 47 there is a hole 52 to which a stud 53 is fixed, said stud by means of a notch on the underside thereof riding on the plate 46 (Fig. 19) and resting thereagainst. Thus plate 47 rests at its one end against the stud 53. 54 indicates the hole, through which passes the screw 48 arranged for the holding of the plate 47 against the bearing plate 40. 59 is a hole, through which passes the plunger 3.

The blocking mechanism for the blocking of the plunger in an intermediate position may thus be fixed in position by means of only one screw 48 and said mechanism may thus be fixed to one or more components in the dial being already provided for other purposes.

The plate 47, carrying the blocking details, instead of being screwed to the bearing plate 40 may be fixed upon another of the elements provided in the dial, e.g. upon the plate 46 supporting the impulse springs. For said purpose the plate 46 may be lengthened upwardly and bent at an angle of 90° so as to form a plane surface, upon which one end of the plate 47 is screwed. The other end of the plate 47 may rest against the bearing plate 40.

It may occur with this type of instruments that it is desired to manufacture some instruments with blocking for the plunger in an intermedaite position and others without such a blocking function. In the last mentioned case the plunger 3, by means of the spring 20, is completely pushed out, when the instrument is lifted from the table, and calls to the station are thus obtained without it being needed to push the button with the finger into a bottom position. By fixing detachably, according to the invention, the plate 47 with the blocking mechanism to the bearing plate 40 by means of the screw 48 it is easy to modify an instrument having no blocking of the plunger in an intermediate position into an instrument having such a blocking and conversely, and thus it is needed to stock only one type of instrument. An instrument without blocking then differs from an instrument with blocking in such a way that no plate 47 supporting the blocking mechanism has been fixed to the bearing plate 40 and that the plunger 3 may be made shorter, the knob 17, by means of which the plunger 3 is fixed to the sliding member 8, being not needed in this case as no sliding member is provided. The plunger 3 only needs to be so long as to actuate the contact springs 44 by the pushing-in. An instrument, at which the plate 47 with the blocking details has been removed from the bearing plate 40, is shown in Fig. 20, which corresponds to Fig. 18, only the portion of the instrument between the lines A, B in Fig. 18 having thereby been disclosed. Because the stud 17 with sets having blocking mechanisms prevents the plunger 3 being pushed out of the instrument by means of the spring 20 there must be, with sets without blocking, some device replacing the stud 17, when this stud is omitted. An example of this is shown in Fig. 19A showing a portion of Fig. 19 drawn on a greater scale and disclosing the modified embodiment of the plunger itself. The plunger 3 is at **3*a* provided with a thinner portion 3*b*, so that the upper portion of the plunger forms a knob 3*a*, which, when the plunger 3 occupies a pushed-out position, rests against a plate 56 (shown in plan view and in end view in Fig. 19B on the same scale as in Fig. 20), which plate at one end is provided with an open notch 58, the width of the notch being smaller than the diameter of the knob 3*a*. The fork-like end of the plate 56** embraces the thinner portion 3*b* of the plunger (Fig. 19A), thereby preventing the plunger from falling out. The plate 57, the bent fork-ends of which embrace the bearing bar 36 (Fig. 20) is fixed to said bar by the same fixing means 57, by which said bar is fixed to the body of the set.

We claim:

1. A telephone instrument of the standing hand set type, comprising switch contacts capable of occupying a signalling position and a talking position respectively, a cradle switch plunger for actuating said switch contacts to cause the latter to move into either one of said positions, said plunger being axially displaceable between a first and a second position, one end of the plunger projecting outwardly from the plane of the effective base of the instrument when the plunger is in said first position, the switch contacts being in said talking position when said plunger is in said first position, said one end being flush with said plane when the plunger is in said second position, the switch contacts being in said signalling condition when said plunger is in said second position, a spring urging said plunger outwardly from said second position towards said first position, the arrangement being such that when said effective base of the instrument is placed on a surface, said plunger is displaced inwardly against the action of said spring from said first position to said second position, and means preventing said plunger, when stationary and in said second position, from being displaced from said second position into said first position, said plunger being manually inwardly displaceable from said second position to a third position from which said plunger, when manually released, is displaceable, at least by the action of said spring, to said first position.

2. An instrument as claimed in claim 1, wherein a part of said plunger remote from said one end is provided with a shoulder, and comprising a leaf spring having a free end portion arranged to abut said plunger immediately beneath said shoulder when said plunger is in said second position, whereby said plunger is prevented from being displaced towards said first position, the arrangement being such that after said plunger is manually released from said third position, said shoulder strikes and deflects said free end portion, whereby said plunger can be displaced to said first position.

3. An instrument as claimed in claim 2, wherein said leaf spring forms part of said switch contacts.

4. An instrument as claimed in claim 1, wherein a part of said plunger remote from said one end is provided with a V-shaped notch extending around the axis of the plunger, and wherein a leaf spring having a V-shaped free end portion of complemental form to said notch is provided, said free end portion being arranged to lie in said notch to prevent said plunger from being displaced into said first position when said plunger is in said second position.

5. An instrument as claimed in claim 1, wherein an additional spring is provided co-operating with said plunger when the latter is displaced from said second position to said third position to urge said plunger towards said second position.

6. An instrument as claimed in claim 1 also comprising a stop member having a cam following part, resiliently movable along a path from an intermediate rest position to a first and a second outward position respectively, a cam carrying member connected to said plunger so as to be rectilinearly displaced upon displacement of said plunger, and a cam on said member having first and second camming surfaces on either of which said cam following part can ride, said first and second camming surfaces extending in like manner obliquely to the direction of the axis of said plunger, a first remote end portion of said cam, which end portion lies clear of said path when said plunger is in said first position, and a second remote end portion of said cam, which end portion lies clear of said path when said plunger is in said third position, said first and second camming surfaces each being able to move said cam following part from said rest position on displacement of said plunger, the first camming surface having an indentation shaped to prevent, when said cam following part lies therein, riding of the cam following part along said first camming surface towards the first remote end portion of the cam whilst permitting the cam following part to ride along said first camming surface towards the second remote end portion of the cam, said cam following part being intended to lie in said indentation when said plunger is in said second position, the arrangement being such that when said cam following part lies in said indentation, displacement of said plunger to said first position is prevented, whilst displacement of said plunger to said third position is permitted, such displacement causing said cam following part to ride along said first camming surface towards the second end portion of the cam and be moved into said first outward position from which said part resiliently returns to said rest position when said plunger reaches said third position, so that thereafter said plunger can be displaced to said first position by the action of said spring, the arrangement also being such that displacement of said plunger from said third position to said first position causes the cam following part to ride along said second camming surface of the cam from said second end portion towards said first end portion and so be moved into the second outward position from which the part resiliently returns to said rest position when said plunger reaches said first position, whereafter displacement of said plunger from said first position to said second position causes the cam following part to ride along said first camming surface of the cam and enter said indentation.

7. An instrument as claimed in claim 6, wherein the path of movement of said cam following part is in a plane lying normal to the axis of said plunger.

8. An instrument as claimed in claim 7, wherein said stop member comprises a leaf spring fixed at one end, said cam following part comprising a pin attached to the free end of said leaf spring.

9. An instrument as claimed in claim 6, wherein said cam carrying member is slidably displaceable along one or more guides fixedly arranged in the instrument.

10. An instrument as claimed in claim 6, wherein said cam carrying member is connected to said plunger so as to allow the latter to rotate about its own axis without rotating said member.

11. An instrument as claimed in claim 10, wherein said plunger is cylindrically shaped, the end connected with the cam carrying member having a cylindrically shaped stud and the cam carrying member having a partly cylindrical notch for receiving said plunger and extending in the longitudinal direction of the latter, said notch widening into a partly cylindrical recess for receiving said stud, said notch and said recess being laterally open, the width of the opening of the recess being a little less than the diameter of said stud whereby upon insertion of said plunger in the cam carrying member, the stud is fittable in the recess with a pressure fit.

12. An instrument as claimed in claim 6, wherein a stop cam is arranged adjacent to, but spaced from, said first camming surface of said cam near said first end portion thereof so that when said cam following part resiliently returns from said second outward position the part is prevented from reaching said first outward position, whereby oscillations of said cam following part are prevented.

13. An instrument as claimed in claim 1 also comprising a cam following part mounted on, and near the inward end of, said plunger, said part being resiliently movable along a path from an intermediate rest position to a first and a second outward position respectively, a cam carrying member fixed relative to said plunger, and a cam on said member having a first and a second camming surface on either of which said cam following part can ride, said first and second camming surfaces extending in like manner obliquely to the direction of said axis, a first remote end portion of said cam, which end portion lies clear of said path when said plunger is in said first position and a second remote end portion of said cam, which end portion lies clear of said path when said plunger is in said third position, said first and second camming surfaces each being able to move said cam following part from said rest position upon displacement of said plunger, the first camming having an indentation shaped to prevent, when said cam following part lies therein, riding of the cam following part along said first camming surface towards the first remote end portion of the cam whilst permitting the cam following part to ride along said camming surface face towards the second remote end portion of the cam, said cam following part being intended to lie in said indentation when said plunger is in said second position, the arrangement being such that when said cam following part lies in said indentation, displacement of said plunger into said first position is prevented, whilst displacement of said plunger to said third position is permitted, such displacement causing said cam following part to ride along said first camming surface towards the second end portion of the cam and be moved into said first outward position from which the part resiliently returns to said rest position when said plunger reaches said third position, so that thereafter said plunger is displaceable into said first position by the action of said spring, the arrangement also being such that displacement of said plunger from said third position to said first position causes the cam following part to ride along said second camming surface of the cam from said second end portion towards said first end portion and so be moved to the second outward position from which the part resiliently returns to said rest position when said plunger reaches said first position, whereafter displacement of said plunger from said first position to said second position causes the cam following part to ride along said first camming surface of the cam and enter said indentation.

14. An instrument as claimed in claim 1, wherein a dial having a finger plate is provided, and said plunger passes through an opening in the centre of the finger plate of the dial.

15. An instrument as claimed in claim 6 and comprising a dial having a finger plate, said plunger passing through the centre of the finger plate of the dial, guide means, said cam carrying member being slidably displaceable along said guide means, and a supporting member, said guide means and said stop member being mounted on said supporting member, which as a unit is detachably mounted on a component of said dial.

16. An instrument as claimed in claim 15, wherein said supporting member has two opposite edges each provided with a lug extending upwardly therefrom, each of said lugs having a slot therein, a stud being provided on each side of said cam carrying member projecting through said slot and being slidable therein and a further lug extending upwardly from the supporting member, and wherein said stop member comprises a leaf spring and said cam following part comprises a pin fixed to one end of the leaf spring, said spring being fixed at its other end to the further lug.

17. An instrument as claimed in claim 16, wherein said supporting member has one end fixed to said dial component, and also comprising a plate on said dial for supporting a spring set of the latter, and a stud positioning the other end of the supporting member on said plate.

References Cited in the file of this patent

UNITED STATES PATENTS

| | | |
|---|---|---|
| 1,747,923 | Babcock | Feb. 18, 1930 |
| 1,944,701 | Weeber et al. | Jan. 23, 1934 |
| 2,405,543 | Blomberg | Aug. 6, 1946 |
| 2,419,388 | Blomberg et al. | Apr. 22, 1947 |